Jan. 29, 1963  L. CATOZZO  3,075,572
APPARATUS FOR SPLICING CINEMATOGRAPHIC FILM
Filed Sept. 24, 1958  2 Sheets-Sheet 1

INVENTOR
LEO CATOZZA

BY Walter S. Bleston
ATTORNEY

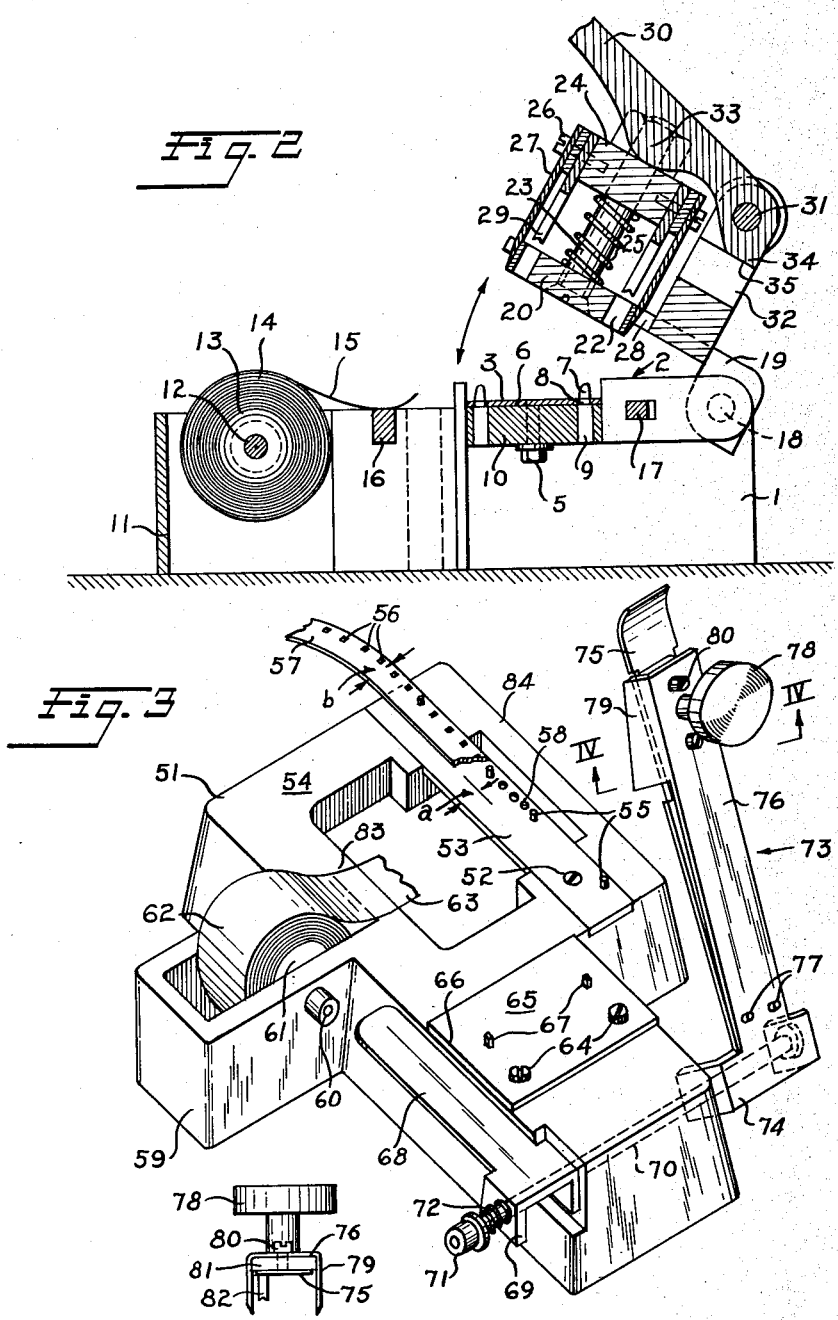

United States Patent Office 3,075,572
Patented Jan. 29, 1963

3,075,572
APPARATUS FOR SPLICING CINEMATO-
GRAPHIC FILM
Leo Catozzo, Rome, Italy, assignor to C.I.R.-Costruzione
Incollatrici Rapide S.a.r.l., Rome, Italy, a corporation
of Italy
Filed Sept. 24, 1958, Ser. No. 763,134
Claims priority, application Italy Dec. 28, 1957
6 Claims. (Cl. 156—505)

The present invention relates to an improved method for splicing cinematographic films and the like, as well as to an apparatus for carrying out such a method.

In order to perform the editing of film, it is necessary to join together different sections of a film in such a manner that the splices may withstand the frequent runs at the moviola and the projector. It is also necessary that the splices can be effected in a quick and easy way. The usual practice for splicing films comprises the steps of scraping the gelatin at the joint point, moistening the base by proper acetone cements and keeping the film pressed until the two ends are joined. Such an operation requires a certain length of time and shows several inconveniences, according to the various methods employed. In fact, if the gelatin is not completely scraped, or the type of cement is not of good quality (and, moreover, a cement is often not suitable for all the kinds of film), or the pressure is not sufficient, or finally the cement does not dry up during the pressure stage, the splice severs, causing a clear waste of time. Another inconvenience of said prior methods is that, in the case of a film section containing a scene, two frames are missed for each splice, so that, if the two discarded portions are to be reinstated for modifying the editing, it is necessary to insert black frames so as not to alter the scene length. The black frames are perceived during the projection and are of great disturbance when located near a cutting transition, as they hinder a good judgment of said transition.

An object of the present invention is to remove said inconveniences and to make quick and ready the splicing operation.

By the new method of the present invention, the gelatin scrape, the cement and the pressure exerted on the film are no more required; waste of time for the cement drying is avoided; the acetone cements and the pressure are removed and the two frames are no more missed; the discarded portions may be reinstated with their original length, if desired.

The improved method according to the present invention substantially comprises the steps of:

Cutting the two film portions in the usual way, i.e. in order to provide either an overlap or preferably a butt splice; overlapping or preferably abutting the two cut portions; applying on the prepared splice a usual adhesive tape, preferably made of transparent material; making on the applied adhesive tape holes corresponding to the perforations of the underlying film, by means of a suitable punching device; cutting the portions of adhesive tape protruding from the films by means of a suitable shearing device; or, if desired, folding on the opposite side of the spliced film portions, eventual not shorn borders of said adhesive tape.

The present invention provides also a semi-automatic apparatus for carrying out the aforementioned method, such an apparatus substantially comprising:

Means for placing two film portions to be spliced in a reciprocal position of exact alignment with the ends overlapped or preferably butted, so that the perforations of one film portion are the continuation of the set of perforations of the other film portion to be spliced; means for supplying a length of an usual adhesive and preferably transparent tape to be applied on the prepared splice; means for making on said length of adhesive tape holes corresponding to the perforations of the underlying portions of the film to be spliced; means for shearing the borders of adhesive tape, protruding from the spliced film, at the edges of the film or at a predetermined distance therefrom; and means for receiving the chips of adhesive tape shorn during said punching and shearing operations.

The objects and the advantages of the present invention will be clearly understood from the following detailed description of two embodiments thereof, with reference to the accompanying drawings, in which:

FIG. 2 is a cross-sectional view of the apparatus shown in FIG. 1;

FIG. 3 is a general view of another embodiment of the apparatus according to the present invention, designed for substandard films; and FIG. 4 is a cross-sectional view at an enlarged scale of a detail of the latter apparatus, taken on the line IV—IV of FIG. 3.

Figure 1:
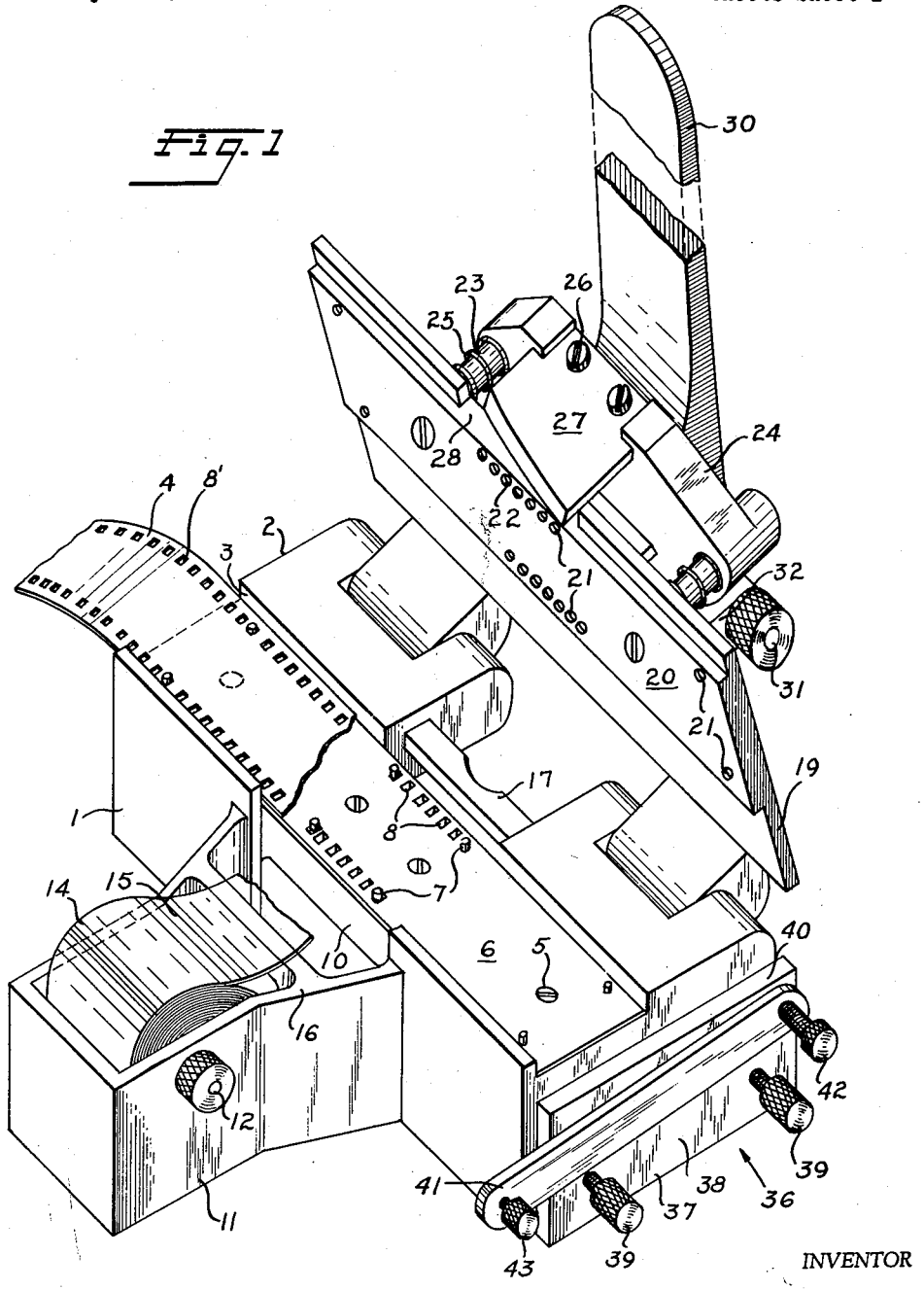
FIG. 1 is a general view of a first embodiment of the apparatus according to the present invention.

With reference to FIGS. 1 and 2, showing the first embodiment of the apparatus according to the present invention, reference number 1 is a base having a generally elongated parallelepipedal shape, preferably made of a light alloy; the base 1 is hollow and has thin walls for reducing its weight.

On the upper surface 2 of the base 1 there is provided a track 3 of such a width, that a usual film 4 may be exactly placed thereinto; of course, there are designed different apparatus with tracks of different widths according to the film gauge (35, 17.5, 16, 9.5, 8 mm. and so on). An apparatus for a standard 35 mm. film is illustrated in FIGS. 1 and 2. On the bottom of the track 3 there is applied by means of screws 5 a sheet die or plate 6 having suitable film holding pins 7 spaced so as to correspond to the perforations of the film 4. Said plate 6 is also provided with a plurality of holes 8, located near the edges of the central portion thereof and corresponding to the perforations 8' of the film 4. The prolongation of said holes 8 is formed by holes 9 of a rather greater diameter, crossing the upper plate 10 of the base 1. On a side extension 11 of said base 1 there is mounted a roller 13 freely turnable round a pin 12; a roll 14 of a usual adhesive and preferably transparent tape 15 is wound on said roller 13. At each side of the die 6 there are provided two flat supports 16 and 17, parallel to and spaced from said die 6, the function of which will be hereinafter described.

At one of the longitudinal upper edges of the base 1, round pins 18, there is hinged a cover-like plate 19 having a longitudinal protruding strip 20 which enters exactly the track 3 when the plate 19 is lowered on the base 1, so that the pins 7 penetrate into corresponding dead holes 21 made within said plate 19, on which through holes 22 corresponding to the holes 8—9 of the track 3 are also provided.

On the plate 19 there are fixed, e.g. by screwing, two pins 23 at right angles to said plate 19; on these pins 23 may be reciprocated a slide 24 which is urged upwards by spiral springs 25 coiled round the pins 23; on both sides of the slide 24 there are fixed, by screws 26, two parallel shearing blades 27 penetrating into grooves 28 of the plate 19, said blades 27 being spaced of a distance equal to the width of the film 4, excepting a very small clearance. On the slide 24, behind each shearing blade 27, there is fastened a plurality of punches 29 having a cutting edge end, and a cross-sectional surface equal to that of the perforations of the film 4. The punches 29 are as many as the holes 8—9 and 22, respectively, and are arranged on two parallel rows so spaced as to be allowed to enter said holes. The slide 24, together with the blades 27 and the punches 29 fixed thereto, is caused to reciprocate slidably on the pins 23 by means of a suitable lever 30 pivoted at 31 on supports 32 integral with the plate 19. The lever 30, by means of a cam projection 33, pushes downwards the slide 24, overcoming the strength of the springs 25, when the plate 19 is leant like a cover on the base 1. The lever 30 is provided with a suitable rear stop 34 limiting the rearward movement of said lever 30, as it strikes against shoulders 35 provided on the supports 32.

On one of the short sides of the base 1 and at the end of the track 3, a device for cutting the films is mounted, which is generally indicated by the reference number 36. Said device comprises a rectangular plate 37 having the upper side 40 provided with sharp corners, said plate 37 being mounted so as to be capable of sliding toward the track 3. For this purpose a pin 38 is fastened on the plate 37, slidable within a proper hole (not shown) of the base 1, the pin 38 being springly urged toward the base 1 by a return spring (not shown), which is arranged in any known manner at the interior of said base 1. Two adjusting screws 39, which may be screwed in the plate 37 and are pivotally mounted within the base 1, allow an adjustment of the distance between the plate 37 and the base 1, while the upper side 40 of the said plate is kept at the same level of the die 6. At lever shearing bar 41, pivoted at one end on a pin 42 secured on the plate 37, may be lifted or lowered by means of a knob 43 fixed at the other end of said bar 41.

The operation of the above described apparatus is as follows: Supposing that two film portions 4 are to be joined end to end, they are placed one at a time on the die 6 within the track 3, so that their perforations 8' are slipped on the pins 7 and the end to be cut is leant on the upper side 40 of the plate 37. By means of the screws 39, the plate 37 is moved toward or away in respect to the base 1 until the shearing bar 41 may cut the film portion at the desired point. After such a cutting operation, said two film portions are arranged overlapped or preferably end to end on the die 6 within the track 3 so that the splice line is located at the center of the die zone where the holes 8 are provided. At this stage, the operator unwinds the adhesive tape 15 from the roll 14 until the end of such tape reaches the support 17, on which it is applied by simple pressure. The tape 15 is then pressed on the splice formed by the film portions 4 at the zone of the holes 8, and on the support 16; the plate 19 is lowered on the upper surface 2 of the base 1; the lever 30 is pressed downwards, so that the slide 24 moves downwards together with the shearing blades 27 and the punches 29; thus the adhesive tape 15 is contemporaneously cut at the edges of the film 4 and punched so as to obtain holes corresponding to the perforations 8' of the film. After raising of the plate 19 the spliced film 4 is removed from the track 4 and, if desired, the application of the tape 15 may be repeated on the opposite side of the same film.

The chips of adhesive tape 15 accumulate on the support 17 and within the holes 9 of the plate 10. The chips accumulated on the support 17 may be easily removed after a number of splices, while those gathering within the holes 9 fall by themselves under the apparatus.

It is apparent that the same apparatus may be employed also in connection with a half-width film (in this case, a 17.5 mm. film); it is well known that these films have perforations 8' only on one side; said perforations having also the same diameter and pitch of the corresponding two-side perforated film (i.e. the 35 mm. film). In such a case, the piece of adhesive tape 15 cut by the blades 27 has a double width in respect to the film, so that it may be folded on the opposite surface thereof, eventually repeating the punching operation after over- turning of the tape, so as to obtain a greater precision of the holes made within the adhesive tape.

Referring now to FIGS. 3 and 4, there is illustrated another embodiment of the apparatus according to the present invention, said embodiment being particularly designed for a sub-standard film, e.g. an 8 mm. film.

On the base 51 there is fastened by screws 52 a rectangular elongated die 53 alined with the upper surface 54 of the base 51; the die 53 is provided with pins 55, for slipping thereon the perforations 56 made only on one side of a film 57, and with through holes 58 made only on one side of the die 53 and corresponding to the perforations 56; the width of the die 53 is equal to the width by the film 57, increased of a length $a$ about equal to the width $b$ of the film band free from perforations. On an extension 59 of the base 51 there is pivotally mounted round a pin 60, a roller 61 on which a roll 62 of a usual adhesive and preferably transparent tape 63 is wound. On the base 51 a rectangular plate 65 is fixed by means of screws 64, said plate 65 having a sharp corner 66 alined with an edge of the base 51. The plate 65 is provided with pins 67 suitably arranged for holding a film portion. A shearing blade 68, integral with a U-shaped support 69, may rotate about a pin 70 threaded into the base 51 and held by a screw head 71 and a spring 72. The blade 68, when turned, passes close by the sharp corner 66 and may cut the end of a film portion slipped on the pins 67 and arranged at right angles to the corner 66. The pin 70, at its other end projecting from the base 51, acts as a fulcrum of a lever 73, also carried by a U-shaped support 74 and formed by a very flexible lower plate 75 and an upper plate 76. The plates 75 and 76 are rigidly connected to each other at one of their ends, e.g. by rivets 77. The plate 75 extends beyond the free end of the plate 76, which is provided with a control button 78 and two downward folded joint blades 79, the reciprocal distance of which is equal to the width of the die 53, excepting a very small clearance. Between the plates 75 and 76, a support 81 is clamped on the upper plate 76 by screws 80, said support 81 bearing a plurality of punches 82 having a cutting edge end, the punches 82 being as many as the holes 58. The lower plate 75 is provided with suitable through holes corresponding to the punches 82 and the pins 55 of the die 53. The lever 73 is mounted on the pivot 70 so that, when turned toward the base 51, the punches 82 penetrate into the holes 58 and the pins 55 into corresponding holes of the plate 75 and of the support 81, while the blades 79 skin the edges of the die 53. At each side of said die 53, parallel thereto and spaced therefrom, two supports 83 and 84 alined with the upper surface 54 of the base 51 are provided, the function of which will be hereinafter set forth.

The operation of the second embodiment of the apparatus according to the present invention, illustrated in FIGS. 3 and 4 of the drawings, is as follows:

The two portions of film 57 to be spliced are placed one at a time on the plate 65 so that the pins 67 penetrate into their perforations 56; the blade 68 is lowered so as to cut each portion of film 57 at the desired point. The cut portions are then arranged on the die 53 in such a way that the pins 55 penetrate into proper perforations 56; the ends of said two film portions are arranged overlapped or preferably end to end; the splice line is placed at the center of the die zone where the holes 58 are located. At this stage, the operator unwinds the adhesive tape 63 from the roll 62 until the end of such tape reaches the support 84, on which it is applied by pressure. The tape 63 is then pressed on the splice located at the zone of the holes 58 and on the support 83; the lever 73 is lowered on the upper surface 54 of the base 51, pressure is applied on the control button 78, so that the blades 79 shear the adhesive tape 63 at the edges of die 53 and the punches 82 make on the tape 63 holes similar to the film perforations 56 wherein the pins 55 engaging in the mentioned corresponding holes of the plate 75 assist in ensuring the proper locations of the holes to be punched in the tape. Then the operator raises somewhat the upper plate 76 by drawing upward the button 78, while maintaining the lower plate 75 lowered, by hand pressing the free end thereof on the base 51. In this way the plates 75 and 76 are drawn slightly away from one another so that, whilst the plate 75 holds the film 57 pressed downwards, the plate 76, by means of the support 81, draws the punches 82 out from the holes made in the tape 63. In want of this provision, the length of tape 63 cut by the blades 79 would remain attached to the punches 82 so as to draw upwards the film 57, which would have to be detached by hand from said punches. It is to be noted that the length of adhesive tape 63 cut by the blades 79 has a width greater than that of the film 57, so that it may be folded on the opposite side of the splice, however without covering at this side the perforations 56, since its excess width $a$ is at the most equal to the width $b$ of the film band free from perforations. Said folding of the adhesive tape 63 renders particularly resistant the splice.

During successive splicing operations, several chips of adhesive tape 63 may accumulate on the support 84, and may be removed after a number of splices. The chips of adhesive tape produced by the punches 82 fall downward through the holes 58 under the die 53.

From the above specification several other advantages of the present invention became apparent, in addition to those already set forth; it is worthwhile mentioning the following further advantages:

(1) Little consumption of adhesive tape (15, 63), the free end of which is advanced every time for a length equal to the film width and to the distance between said film and the outer edge of the side support;

(2) No contact of the operator's fingers with the portion of adhesive tape to be applied on the film, thus avoiding the possibility of soiling both the tape and the film;

(3) Possibility of application to either picture or sound films, and particularly without altering the quality and continuity of the magnetic films, as any film overlap may be avoided;

(4) Possibility of reinforcing a splice by various layers of adhesive tape;

(5) Possibility of employing the same apparatus for a standard film (e.g. 35 mm.) and the corresponding half-width film (e.g. 17.5 mm.);

(6) Possibility of employing the same apparatus for film of different gauges by substitution of the die (6,53) and the blades-punches unit;

(7) Possibility of quick repairs of eventual tears or damages of the film perforations;

(8) Full safety and easiness of operation;

(9) Greatly reduced cost, weight and cumbersomeness of the apparatus.

It is to be understood that various alterations and modifications may be resorted to the above described embodiments of the present invention by those skilled in the art, without departing from the spirit and the scope of the invention as defined by the appended claims.

What is claimed is:

1. A device for splicing several ends of a motion picture film comprising an elongated base including a lateral extension forming a pivotal accommodation for a roll of adhesive tape, a two-partite channel-shaped groove provided in the top of said base and lengthwise thereof, said groove parts being aligned and spaced from each other sideways of said extension, a lower die-plate in said groove extending through both groove parts and including a median portion across said spacing of said groove parts, said die-plate being provided with at least one row of a series of perforations of the film to be spliced, said series of perforations extending over a length according to the width of said tape, a first pair of registering pins extending from said lower die plate upwards at the ends respectively of said series of perforations, at least one second pair of registering pins extending from said lower die plate in the ranges of said grooves parts, respectively, a flat support for a portion of tape from a said roll parallel to and spaced from said median die plate portion on each of its sides an upper die plate hinged to said base in co-operative relationship to said lower die-plate, said upper die plate having substantially the same width and length as said lower die plate, said upper die plate being provided with a plurality of perforations in respective registry with the perforations and registering pins when the upper die plate is applied to the lower die plate, a reciprocating slide member yieldably connected to and disposed on top of said upper die plate, punches secured to said slide member for passage through the perforations of said upper die plate in registry with said series of perforations on said lower die plate, a pair of shearing blades secured to said slide member and spaced from each other a distance equal to the width of said die plates and a manually operative member connected to said upper die plate and operable to press said upper die plate to thereby lower said upper die plate on said lower die plate, additional means disposed on said manually operable member engaging the upper surface of said slide member to urge said slide member toward said lower die plate to thereby move said punches through the respective perforations and to cause said blades to cut said tape between said lower die plate and said supports, and means associated with said lower die plate for shearing the severed ends of the film.

2. A device as in claim 1, wherein the edges of said median lower die plate portion are in co-operative relationship to said blades to cut said tape, and said blades have a length at least as large as the width of said tape.

3. A device as in claim 1, further including a headed bolt secured to the upper die plate and extending through said element, a spring on said bolt tending to spread said element from said upper die-plate, a lug on said upper die plate extending upward thereof adjacent the hinge of said die plate, and a manually operative lever pivoted to the upper end of said lug so as to bear on said element.

4. A device as in claim 3, wherein said lug and said lever have co-operative surfaces to prevent the lever from being raised above a predetermined height.

5. A device as in claim 1, wherein the flanks of said groove portions extend above said lower die plate so as to be adapted to receive therebetween exactly fitting said upper die plate when the latter is pressed down.

6. A device as in claim 1, wherein said lower and upper die plates are provided with two series of registering perforations, one series on each side of said plates, and said punches are correspondingly provided on said element.

References Cited in the file of this patent
UNITED STATES PATENTS

| | | |
|---|---|---|
| 1,464,265 | Greswold | Aug. 7, 1923 |
| 2,506,933 | Mercer | May 9, 1950 |
| 2,565,009 | Wallingsford | Aug. 21, 1951 |
| 2,672,180 | Nichols et al. | Mar. 16, 1954 |
| 2,794,488 | Fritzinger | June 4, 1957 |
| 2,963,073 | Krysotek | Dec. 6, 1960 |